May 31, 1927.
W. K. HERBST
HOSE COUPLING
Filed Aug. 30, 1922
1,630,895
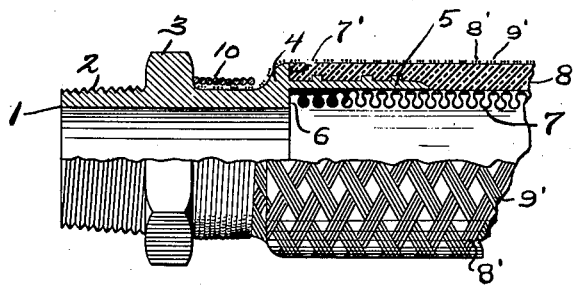
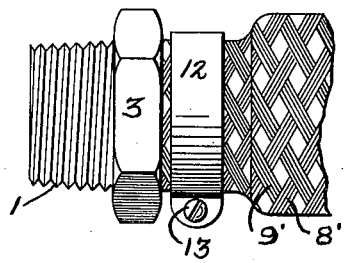
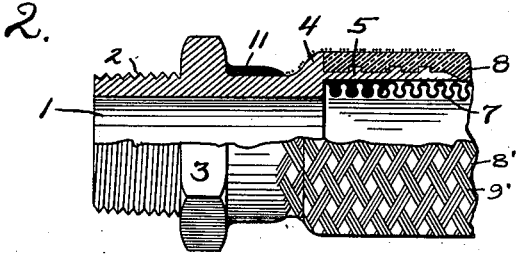
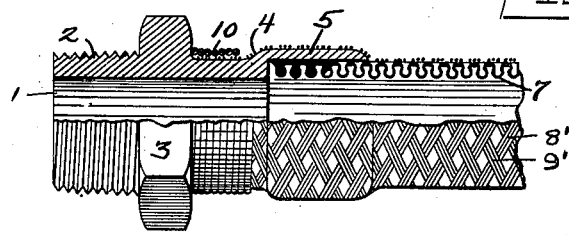
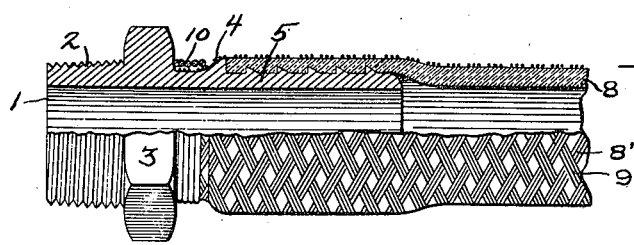
William K. Herbst INVENTOR
BY
Thomas Howg ATTORNEY Patented May 31, 1927.

1,630,895

UNITED STATES PATENT OFFICE.

WILLIAM K. HERBST, OF HILLSIDE, NEW JERSEY, ASSIGNOR, BY MESNE ASSIGNMENTS, TO TITEFLEX METAL HOSE CO., A CORPORATION OF NEW JERSEY.

HOSE COUPLING.

Application filed August 30, 1922. Serial No. 585,125.

The present invention relates to flexible tubes and the manner of attachment to couplings.

One object of this invention is to provide a coupling to which a flexible tube may be securely attached.

A further object is to provide a means whereby the exterior armor of the flexible tube may be secured to a coupling.

A further object is to provide a means of attaching a flexible tube to a coupling which will insure tightness and withstand strains.

Further and ancillary objects will appear upon inspection of the annexed specification and appended claims.

In the drawings, which illustrate this invention—

Figure 1 is a side view of a coupling and tube partly in section and partly in elevation;

Fig. 2 is a view similar to Figure 1 showing a different manner of securing the tube to the coupling;

Fig. 3 is a side view partly in elevation and partly in section of a modified coupling and another form of tube;

Fig. 4 is a side view in elevation of a coupling and tube showing a different manner of securing the tube to the coupling; and Fig. 5 is a side view partly in section and partly in elevation of a modified coupling with a tube secured thereto.

Referring to the drawings the coupling 1 is provided with a threaded nipple 2 whereby the flexible hose secured to the coupling may be secured to any desired orifice or other pipe. The coupling also comprises a flange or enlargement 3 of octagon periphery to provide for engagement of a wrench to turn the coupling in the usual manner to engage it or disengage it. The coupling is further provided with a flange or shoulder 4, a depressed space or groove being formed between the wrench hold 3 and the shoulder 4. On the opposite side of the flange 4 from the groove is a corrugated nipple or extension 5 adapted to receive and hold a rubber tube in the usual manner of employing such nipples.

It is to be observed that, referring particularly to Fig. 1, the nipple is so located that the shoulder 6 is provided upon the coupling upon the interior of the nipple 5 and also a shoulder 7' is formed on the coupling outside the nipple.

The construction referred to insures a permanent connection between the hose and coupling under all pressures and also is strengthened against mechanical strains by the metallic braid which is permanently secured to the coupling. The structure is especially advantageous at high pressures because, after the pressure is put on the hose, the braid draws down on the coupling increasing the mechanical grip as the pressure on the inside of the hose becomes greater. The construction indicated is also of value in insuring a tight and reliable connection between the hose and coupling in those installations where there is always a presence of oil in the tubing as for instance in many installations including pneumatic tools. The oil causes the rubber to soften so that its grip upon the coupling becomes less firm and it soon blows off, whereas with the present construction the rubber is so reinforced and held in position by the metallic braided covering that this disadvantage in the use of rubber hose is avoided. In some extreme instances a clamp might be placed about the hose outside the braided covering and about the nipple on which the rubber tube is placed, so that the tendency of the braided covering to reinforce the rubber against blowing outwardly is further reinforced. This, however, is only necessary in extreme instances where, for instance, with tubes of extremely small diameters the internal pressure might exert a greater pressure toward bursting than is compensated for by the end thrust causing the braid to tighten down. The application of the ordinary hose clamp, as referred to, will insure a permanent tight connection at the coupling under these extreme circumstances.

In the structure shown in Fig. 1, the hose to be secured to the coupling comprises a corrugated flexible metal tube 7 which may be of the structure as shown in the patent to Louis H. Brinkman, No. 1,198,392, September 12, 1916, a rubber tube 8 surrounding the flexible metal tube and outside of the rubber tube is a braided structure comprised of strands of metal wire, some strands as 8' being wound in one direction, while other strands as 9' being wound in the other direction helically about the hose and intertwined or interwoven with each other as shown. The inner metal tube 7 is inserted within the nipple 5 and is pushed in until it comes against the shoulder 6, the shoulder 6 being of such depth as to accommodate a metal tube having an internal bore substantially that of the bore of the coupling. The metal tube may then be secured to the coupling by soldering. The rubber tube is stretched over the nipple 5 and comes against the shoulder 7'. It will be seen that the depth of the face 7' is substantially that of the rubber tube so that the rubber is substantially flush with the periphery of the shoulder 4. The outer braided wire covering is carried over the flange 4 into the recess between it and the enlargement 3 and is firmly secured to the coupling therein by tightly wrapped wire 10 as shown and this may be augmented by soldering if desired.

The structure of Fig. 2 is the same as that of Fig. 1 except that solder 11 is relied on to secure the braided covering to the coupling.

Also as shown in Fig. 4 the braided covering might be secured to the coupling by an open ring clamp 12 (an ordinary hose clamp) adapted to be set down tightly upon the covering and secure it to the coupling by means of a screw 13 adapted to draw the ends of the ring together.

In the structure shown in Fig. 3, the rubber tube is not present, the hose comprising the corrugated flexible metal tube 7 with the braided covering comprising the strands 8' and 9' thereon. The coupling is modified accordingly in that there is no recess formed for the rubber tube, there being simply an internal recess for the metal tube 7, the braided covering passing over the outside of the extension and over the shoulder 4, being secured to the coupling by wire wrapping 10 as in the case of Fig. 1.

In the structure shown in Fig. 5 the inner metal tube is not present, the hose consisting of a rubber tube 8 and the outer covering comprising the braided strands 8' and 9'. In this case the inner metal tube not being present, the interior recess and shoulder for receiving it are not present while the rubber tube 8 is stretched over the nipple 5 and the outer braided covering passes over the shoulder 4 and is secured in the groove between the enlargement 3 and the shoulder 4 in a manner as described in connection with Fig. 1.

While the invention has been illustrated in what is considered its best application it may have other embodiments without departing from its spirit and is not limited to the structures shown in the drawings.

What I claim is:

1. The combination of a coupling provided with an extension, a shoulder between said extension and the rest of said coupling, a flexible tube secured to said coupling and abutting said shoulder at one side thereof and means for securing said tube to said coupling on the other side of said shoulder, said means comprising wire braid, said means and the abutting end of said flexible tube being spaced apart longitudinally of the tube.

2. The combination with a coupling, of a tube comprising a corrugated inner tube, a rubber tube thereabout and a helically stranded covering over said rubber tube, said coupling having a portion surrounded by said rubber tube, said helically stranded covering being secured to said coupling and adapted to bear against said rubber to press it against said coupling portion on stress longitudinally of the tube and said corrugated tube having an abutment against said coupling.

3. The combination with a coupling having an exterior shoulder and an interior shoulder with an extension extending from said shoulders, of a flexible tube comprising a corrugated inner tube, a rubber covering surrounding the same and a helically stranded covering surrounding said rubber tube, said corrugated tube entering within said extension, said rubber tube extending about the outside of said extension and said stranded covering extending over the exterior shoulder on said coupling and being secured to said coupling.

4. The combination with a coupling having an exterior radial projection, of a rubber tube having one end upon one side of said projection and a helically stranded metal covering about said rubber tube extending beyond the end thereof and bent downwardly about said projection into a recess upon the other side of said projection from the end of said rubber tube, said covering being secured to said coupling in said recess.

5. The combination with a coupling having an exterior radial projection, of a rubber tube having one end upon one side of said projection and a helically stranded metal covering about said rubber tube extending beyond the end thereof and bent downwardly about said projection into a recess upon the other side of said projection from the end of said rubber tube, said covering being secured to said coupling in said recess, said coupling having an extension entering within the end of said rubber tube.

6. The combination with a coupling having an exterior radial projection, of a rubber tube having one end upon one side of said projection and a helically stranded metal covering about said rubber tube extending beyond the end thereof and bent downwardly about said projection into a recess upon the other side of said projection from the end of said rubber tube, said covering being secured to said coupling in said recess and a flexible metal tube inside said rubber tube.

7. The combination with a coupling having an exterior radial projection, of a rubber tube having one end upon one side of said projection and a helically stranded metal covering about said rubber tube extending beyond the end thereof and bent downwardly about said projection into a recess upon the other side of said projection from the end of said rubber tube, said covering being secured to said coupling in said recess, said coupling having an extension entering within the end of said rubber tube, and an interior shoulder and a flexible metal tube extending inside said extension and having its end in line with the said interior shoulder.

In testimony whereof I have signed this specification this 29th day of August, 1922.

WILLIAM K. HERBST.